United States Patent [19]

Dowding et al.

[11] 4,370,942
[45] Feb. 1, 1983

[54] PERFORATION OF WEB MATERIAL, ESPECIALLY UNITING PAPER FOR MAKING VENTILATED FILTER CIGARETTES

[75] Inventors: John G. Dowding; Edward G. Preston, both of London, England

[73] Assignee: Molins Limited, London, England

[21] Appl. No.: 174,506

[22] Filed: Aug. 1, 1980

[30] Foreign Application Priority Data

Aug. 2, 1979 [GB] United Kingdom ................. 7927004
Apr. 10, 1980 [GB] United Kingdom ................. 8011879
Apr. 14, 1980 [GB] United Kingdom ................. 8012189

[51] Int. Cl.³ ............................................... B05C 1/16
[52] U.S. Cl. ....................................... 118/40; 83/660; 118/211
[58] Field of Search ................ 118/37, 40, 38, 39, 118/46, 211, 212; 83/660, 347

[56] References Cited

U.S. PATENT DOCUMENTS 1,726,611  9/1929  Cook ................................. 83/660 X
2,366,187  1/1945  Friedwald ........................ 118/40 X
3,074,303  1/1963  Waters ............................. 83/660 X
3,170,354  2/1965  Scholl ............................. 83/347
4,184,619  1/1980  Stewart et al. ................... 83/660 X Primary Examiner—John P. McIntosh
Attorney, Agent, or Firm—Antonelli, Terry & Wands

[57] ABSTRACT

A device for perforating or cutting a moving web of paper by means of pins, especially uniting paper for use in a cigarette filter attachment machine, comprises a roller carrying pins for perforating the paper in cooperation with a backing roller arranged to support the paper while it is being perforated, the backing roller being driven so that its peripheral speed equals that of the perforating roller, and having a deformable surface formed with indentations corresponding to the positions of the pins, the deformable material forming the surface of the backing roller being such that the indentations are formed by the pins when the rollers are first operated. The surface portion or portions of the backing roller aligned with the pins may comprise a thin metal portion in the form of a sleeve which covers recesses in the main body of the backing roller. The sleeve is perforated by the pins when the rollers first operate.

6 Claims, 7 Drawing Figures

PERFORATION OF WEB MATERIAL, ESPECIALLY UNITING PAPER FOR MAKING VENTILATED FILTER CIGARETTES

This invention relates particularly to the manufacture of ventilated cigarettes by assembling cigarettes and filters by means of perforated uniting paper. However, this invention may also be used for perforating other web materials, and it may also be extended to the cutting of uniting paper or other web material by means of pins.

According to one aspect of this invention, a device for perforating a moving web of paper, especially uniting paper for use in a filter attachment machine, comprises a roller carrying pins for perforating the paper in cooperation with a backing roller arranged to support the paper while it is being perforated, the backing roller being driven so that its peripheral speed equals that of the perforating roller, and having a deformable surface formed with indentations corresponding to the positions of the pins, the deformable material forming the surface of the backing roller being such that the indentations are formed by the pins when the rollers are first operated.

Thus the indentations in the backing roller exactly correspond in position to the pins.

The deformable surface of the backing roller may be of thermoplastic material; it may be heated initially to facilitate deformation by the pins to produce the indentations, or alternatively the pins may be heated. However, in a preferred construction, the backing roller has thin metal portions forming its peripheral surface in areas aligned with the pins, which portions the pins can penetrate when the rollers are first operated. The same principle may be applied to cutting a web of paper, for example tipping paper or a plastics web material, e.g. polypropylene, used for wrapping cigarette packets and other articles; for that purpose, each cut may be achieved by forming a row of closely spaced perforations across the web material, thus considerably weakening the web, and by feeding the severed web portions away from the cutting station at a speed greater than the speed of the web.

In the case of a filter attachment machine used for making ventilated cigarettes there is preferably, according to a second aspect of this invention, a perforating roller having groups of pins at circumferentially spaced positions around the roller, the roller being timed so that the gaps between the areas perforated by the pins coincide with positions at which the uniting paper is laterally cut to produce individual portions for wrapping around corresponding cigarette and filter assemblies. The machine preferably includes means of applying adhesive to the uniting paper, except over areas which are perforated by the pins. Perforating by pins in this manner is preferable to the alternative which we visualize, according to which alternative spaced batches of holes are made in uniting paper by means of an electrical perforator, for example a spark perforator, or a laser, electron beam or other radiant energy device may be used, in which case the energising of the perforator can be controlled by an electrical signal derived from the filter attachment drive mechanism.

Examples of devices according to this invention will now be described by way of example with reference to the accompanying drawings in which.

Figure 1:
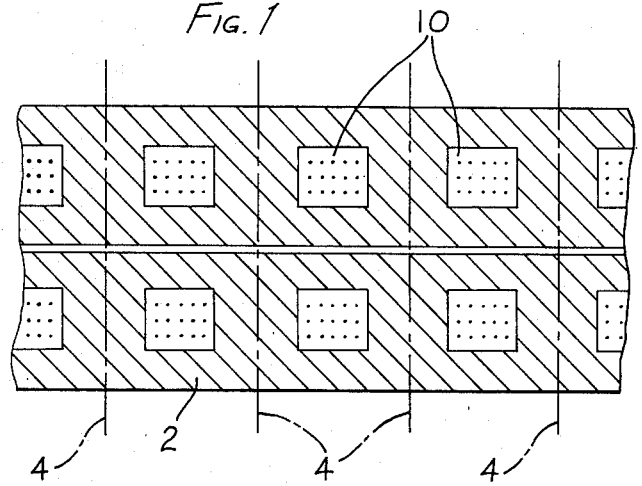
FIG. 1 shows a web of "cork" uniting paper perforated in accordance with this invention.

FIG. 1 shows a web 2 of uniting paper which is twice the width required for assembling one cigarette, so that "double-length" cigarettes can be assembled from it in a known fashion. The positions at which cuts will be made to separate the individual portions of the web are indicated by the dotted lines 4. As the web is fed into the filter attachment machine, it first passes under a roller 6, FIG. 2, which has groups of perforating pins 8 arranged so as to form patches 10 of perforations in the paper.

A backing roller 7, of the same diameter as roller 6, is arranged beneath the path of the web, and is formed with areas of indentations 9 corresponding to the pins 8. In order to facilitate the formation of these indentations, the surface of the roller 7 may be made of a thermoplastic material, while the pins are of steel. The indentations can then be formed initially by heating the surface of the roller 7 (or the pins) and running the two rollers 6 and 7 together. The rollers 6 and 7 are driven at the same speed via gears 11 and 12 from an input shaft 13 and may be so arranged that the distance between their axes can be slightly adjusted to vary the depth of penetration of the pins through the web and hence the hole sizes, for example in response to a continuous measurement of the resultant ventilation level of the completed cigarettes. This adjustment is facilitated by making the surface of roller 7 of a material that is slightly resilient as well as being thermoplastic.

Each patch of perforations provides an area of ventilation for an individual cigarette assembly, the rollers 6 and 7 being geared to a cutting device downstream (not shown) so that the perforations are formed in the right places. A further roller 112 applies a layer of adhesive 14 to the web before it is cut, except over the perforated areas, the roller 112 also being suitably geared to the cutting device.

In the meantime the lengths of cigarette rod and filter tips are also being fed by suitable feeding means, not shown, to an assembly device to be assembled by successive portions of the uniting paper in any known manner.

Figure 3:
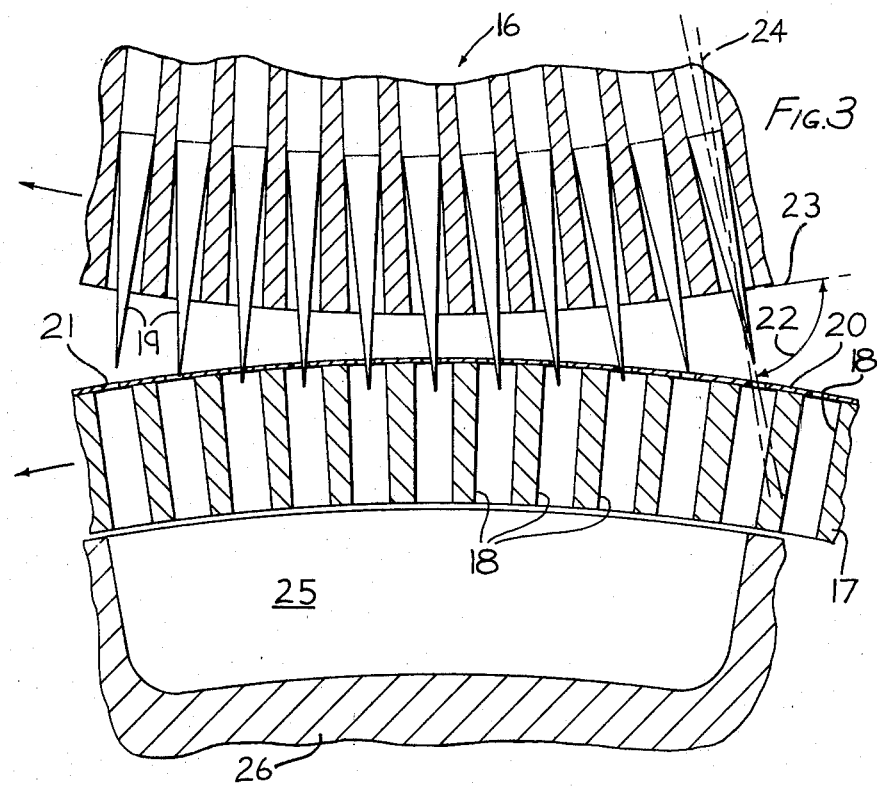
FIG. 3 is an enlarged section through adjacent parts of the perforating and backing rollers of a different device, the section being in a plane at right angles to the axes of the rollers.

FIG. 3 shows a different perforating device comprising a pin roller 16 and a backing roller 17. In this example, the backing roller is formed with pre-drilled radial passages 18 in the region where pins 19 on the roller 16 are arranged to enter. Around the backing roller 17 there is a thin metal sleeve 20 covering the passages 18. When the rollers first operate, the pins 19 penetrate the sleeve 20 to form apertures 21.

As in the previous example, the rollers 16 and 17 are driven so as to have the same peripheral speed. They preferably have the same diameter, so that each pin, during each revolution of the rollers, enters the aperture which was formed by the same pin. However, as an alternative the roller 16 may, for example, be one half or one third the diameter of the roller 17, in which case each pin forms two or three holes in the sleeve 20 during successive revolutions of the roller 16 when the device is first operated.

Figure 2:
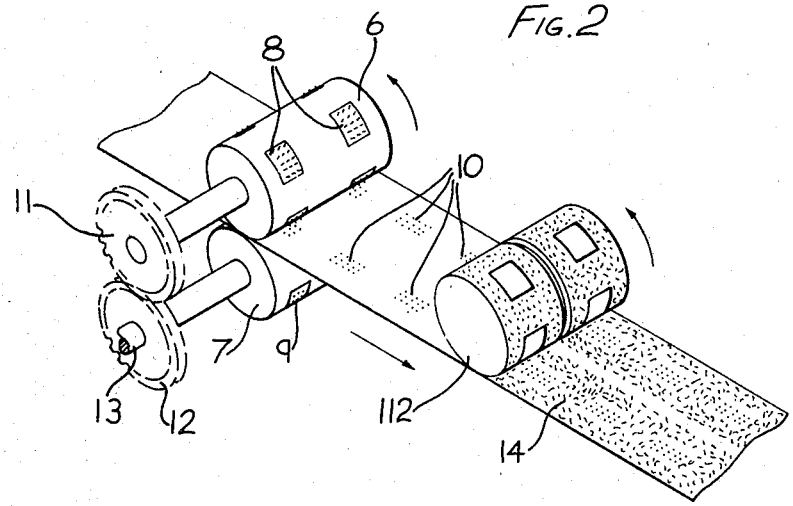
FIG. 2 shows a form of device for producing the uniting paper of FIG. 1.

The pins 19 may be formed in circumferentially spaced batches around the roller 16, as described with reference to FIG. 2. Alternatively, there may be pins 19 at regular intervals all the way around the roller 16, the roller 17 in that case being formed similarly with passages 18 all the way around its periphery.

Instead of being radial with respect to the roller 16, it should be noted that each of the pins 19 is slightly inclined backwards; that is to say, the angle 22 between a tangential line 23 and a radial line 24 is less than 90°. This helps, inter alia, to ensure that the pins come cleanly out of the paper web (not shown in FIG. 3) without tending to pull the web off the roller 17.

Any dust or other debris produced by the action of the pins in penetrating the paper web is drawn away by suction through a channel 25 in a member 26 within the roller 17. The channel 25 may, if desired, extend circumferentially further than is shown in FIG. 3.

Figure 4:
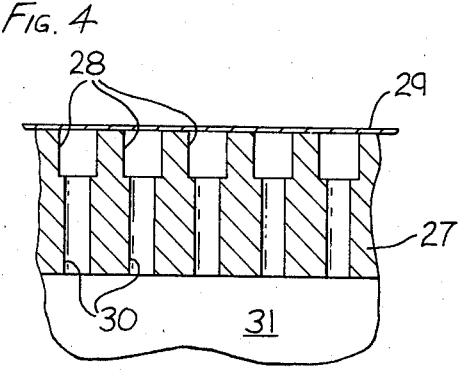
FIG. 4 is a section, in a longitudinal plane, of a modified backing roller.

There may be two or more circumferentially extending rows of pins 19 on the roller 16, and a similar number of circumferentially extending rows of radial passages 18 in the roller 17. As an alternative, each circumferentially extending row of passages 18 in the roller 17 may be replaced by a circumferentially extending groove. Such an example is shown in FIG. 4, which is a longitudinal section through a roller 27 which is similar to the roller 17 in FIG. 3, except that the rows of radial passages are replaced by circumferentially extending grooves 28 (of which there are five in this example). As in FIG. 3, the roller 27 is surrounded by a thin metal sleeve 29, which in FIG. 4 is shown in the condition prior to being perforated by pins such as pins 19 in FIG. 3. Again, in order to conduct away any debris, there are radial passages 30 extending from the grooves 28 at regular intervals to a suction chamber 31.

As an idea of scale, the diameter of the pins 19 and of the radial passages 18 shown in FIG. 3 may be, for example, 0.62 mm. The thickness of the sleeve 20 may, for example, be approximately 0.1 mm or somewhat greater (e.g. up to 0.4 mm), depending upon the material.

We believe that the material of the sleeve 20 should be as hard as possible, consistent with the need to perforate it by means of the pins. A hard stainless steel may be used. This may be obtained in sheet form and may be wrapped tightly around the roller 17 and may be secured, for example, by adhesive. Another possibility is that a web of stainless steel or other suitable sleeve material may be wound helically around the roller 17.

Another possibility, which may be preferable, is that the sleeve 20 may be formed as an integral part by a process involving electro-deposition of nickel. The sleeve thus formed may be a tight fit around the roller 17 and may be placed into position around the roller 17 after first freezing the roller.

The apertures 21 formed in the sleeve 20 shown in FIG. 3 are shown with clean edges such as could be produced by a punching operation. In practice, depending upon the hardness of the sleeve material, the edges may in fact be inwardly deformed without any material being removed. However, we have found that, with a hard material, clean (non-belled) holes can be formed by suitably hard tapered pins as shown in FIG. 3.

Although we believe it might be possible, with clean-edged apertures in the sleeve 20, to remove material from the paper web with a type of punching operation. The alternative, which we have achieved in experiments, is that the paper is bent inwards through the apertures 21 in the sleeve at least to some extent, leaving a rough edge on the inner face of the paper. This rough edge may be removed by passing the paper subsequently around a roller driven at a speed slightly different from the paper so as to mill or rub away the inwardly deformed paper or at least some of it. A further roller may be arranged to press the paper against the roller performing the milling or rubbing action.

Figure 6:
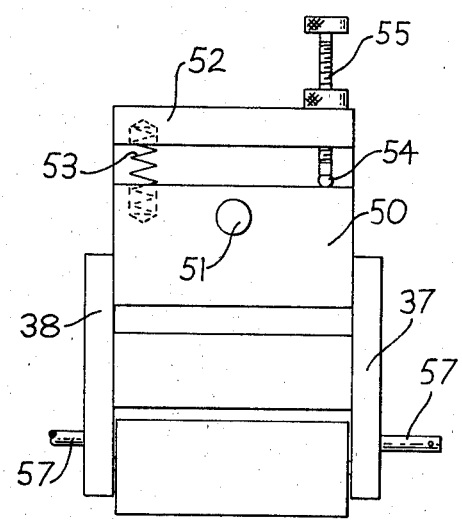
FIG. 6 is a view from the left of FIG. 5.
Figure 5:
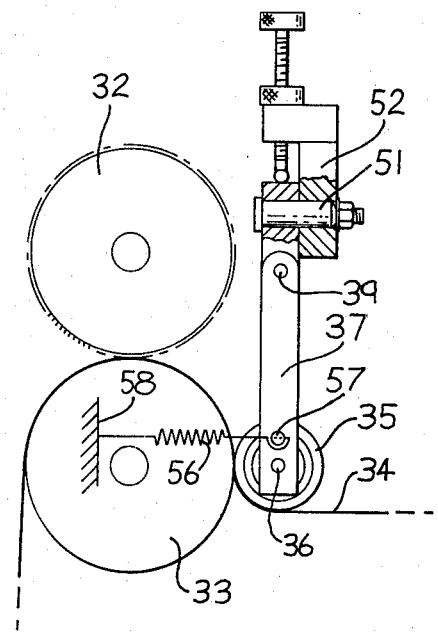
FIG. 5 is an overall view of a complete perforating device including an adjustable pressure roller.

FIGS. 5 and 6 show a general arrangement of a perforating device comprising a pin roller 32 and a backing roller 33. These rollers may be like the rollers 16 and 17 in FIG. 3. A web 34 which is to be perforated passes around the roller 33 and is initially pressed against the roller 33 by a roller 35 mounted for rotation on a spindle 36 carried by arms 37 and 38. These arms are pivoted by a pin 39 to a member 50 which is in turn pivoted by a pin 51 to a fixed member 52. A compression spring 53 between the members 50 and 52 tends to rotate the member 50 about the pin 51 into engagement with an abutment 54 on a screw 55. Thus rotation of the screw 55 allows for slight angular adjustment of the axis of the roller 35. This is useful to ensure correct tracking of the paper web 34 with respect to the roller 33. The roller 35 is urged towards the roller 33 by springs 56 engaging between posts 57 on the arms 37 and 38 and frame members 58.

There may be an additional pressure roller (possibly adjustable like the roller 35) on the opposite side of the roller 33 to ensure that the web 34 passes properly around the roller 33, i.e. is not pulled away by the pins on the roller 32.

Figure 7:
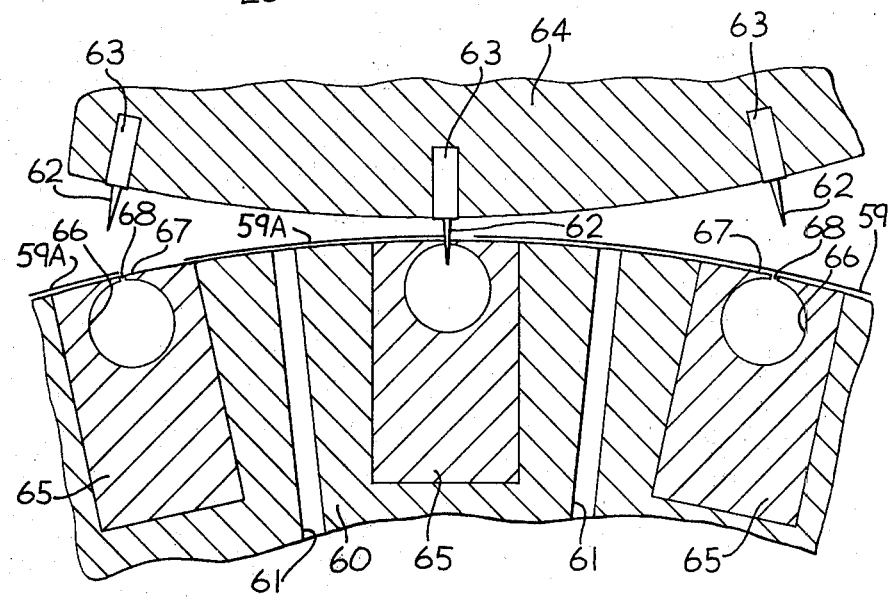
FIG. 7 is a section through two rollers forming a web cutting device.

FIG. 7 shows an arrangement for cutting a moving web 59 to produce a stream of spaced web portions 59A on a drum 60. The arrangement basically may be as described in German patent application No. 2,755,648 or U.S. Pat. No. 4,184,619.

The web 59 is fed tangentially towards the drum 60 at a speed lower than the peripheral speed of the drum and is gripped by suction applied through ports 61 in the drum. Each cut is made by means of a row of closely spaced pins 62 mounted in bodies 63 contained in axially extending grooves in a roller 64. At corresponding positions on the roller 60, there are axially extending grooves containing inserts 65 each having an axially extending bore 66 close to its outer periphery, leaving an outer wall 67 which is thin enough to be penetrated by the pins 62 when the device is first operated. Thus rows of closely spaced apertures are formed in the wall 67 to receive the pins 62. The holes or apertures formed by the pins may lie so close together as to form virtually a continuous slit.

The pins 62 not only perforate the web, but assist in pulling each severed web portion away from the continuous web, which then slips slightly along the surface of the roller 60 as a result of its slightly lower speed. Thus spaced web portions 59A are produced on the roller 60.

During manufacture of the roller 60, the bores 66 may be drilled before the inserts 65 are secured in the roller 60. The roller is then machined to the required diameter, and that machining operation reduces the thickness of the wall 67 of each insert to the required value.

Any of the perforating devices described above may be used for perforating different web materials. For example, a web of plastics material for use in making surgical dressings may be perforated in this manner so as to be air pervious.

It should be noted that the diameter or width of the passages 18 (FIG. 3) and grooves 28 (FIG. 4) is not substantially greater than the perforations produced by the pins. In fact the unsupported areas of the sleeve (i.e. over the passages or grooves) are as small as possible, consistent with the need to ensure that the pins do enter the passages or grooves but without either having to be very precisely located with reference to the other.

In FIG. 3, FIG. 4 or FIGS. 5 and 6 the pins, the paper and the sleeves all have the same speed. As an alternative, while keeping the same angular velocity for both rollers, the pins may be arranged to move at a slightly higher or lower velocity than the paper and sleeve (by virtue of being at a slightly different diameter) so as to have a slight tearing action on the paper, thus producing small inwardly bent flaps in the paper; these flaps may be subsequently milled or rubbed away as described above. Another possibility is that the paper may be fed at a speed slightly different from that of the sleeve, the portions of the paper which are bent into the apertures in the sleeve by the pins being at least partly removed by the edges of the apertures or by the slight rubbing action of the sleeve on the paper, for which purpose the paper should preferably pass around the backing roller along a substantial arc (e.g. as in FIG. 5); in this case the speed of the paper would be determined by separate feed rollers (not shown) downstream of the perforating device, which speed may be equal to that of the pins or slightly different so as to produce small bent-in flaps as mentioned above.

We claim:

1. A filter attachment machine including means for perforating the uniting paper which is used to secure a filter to a cigarette, comprising a perforating roller having groups of pins at circumferentially-spaced positions, means including a backing roller for moving a band of uniting paper in contact with said perforating roller to perforate areas of the paper with said groups of pins, and drive means for driving both the perforating roller and the backing roller with a predetermined timing so that the peripheral speed of the backing roller exactly equals that of the perforating roller, said backing roller having a permanently-deformable surface formed with indentations exactly corresponding to the positions of the pins carried by said perforating roller, the deformable material forming the surface of the backing roller being such that the indentations are permanently formed by the pins when the rollers are first operated and the relative sizes of said perforating roller and said backing roller are such that, during each successive rotation of said rollers, each pin exactly enters the same indentations in said backing roller which it originally formed therein, whereby gaps are formed between the areas perforated by the pins which coincide with positions at which the uniting paper is to be laterally cut to produce individual portions for wrapping around corresponding cigarette and filter assemblies, each group of pins comprising a plurality of circumferentially-extending rows of substantially-equal length ending at each end near the cutting position, said groups being spaced so as to leave said gaps in the form of unperforated areas extending across the paper and of a width greater than the distance between adjacent pins in a group.

2. A filter attachment machine according to claim 1, in which the surface of the backing roller is of thermoplastic material.

3. A filter attachment machine according to claim 1, and further including a cutting device which is arranged to cut the paper web along transverse lines lying between the perforated areas of the paper.

4. A filter attachment machine according to claim 3, including means for applying adhesive to the uniting paper along edge portions of the paper and laterally along areas lying between the perforated areas.

5. A filter attachment machine according to claim 1, including means for applying adhesive to the uniting paper, except over areas which are perforated by the pins.

6. A filter attachment machine according to claim 1, in which the diameter of said perforating roller and the diameter of said backing roller are in a ratio 1/N, where N is an integer.

* * * * *